Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 1

Inventors
Eugene Georges Geoffroy
Aimé Pierre Laudrin
by

Aug. 25, 1964 E. G. GEOFFROY ETAL 3,146,127
MACHINE FOR GLUEING AND DRYING THE BACKS OF STITCHED BOOKS
Filed March 12, 1962 12 Sheets-Sheet 2

Aug. 25, 1964    E. G. GEOFFROY ETAL    3,146,127
MACHINE FOR GLUEING AND DRYING THE BACKS OF STITCHED BOOKS
Filed March 12, 1962    12 Sheets-Sheet 4
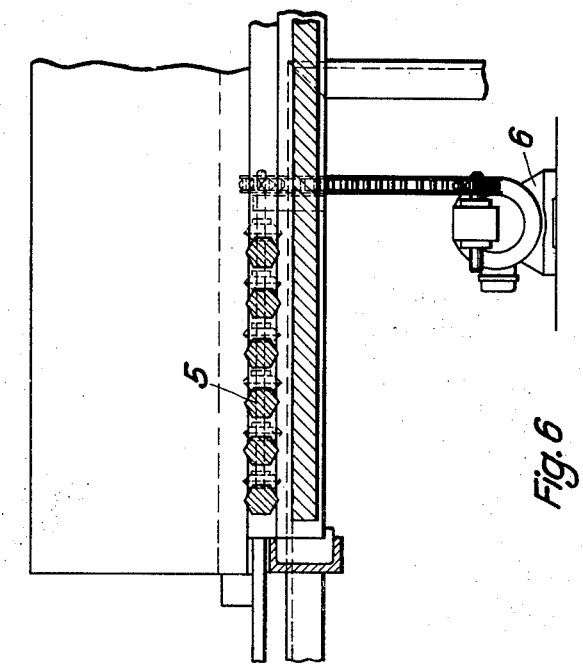
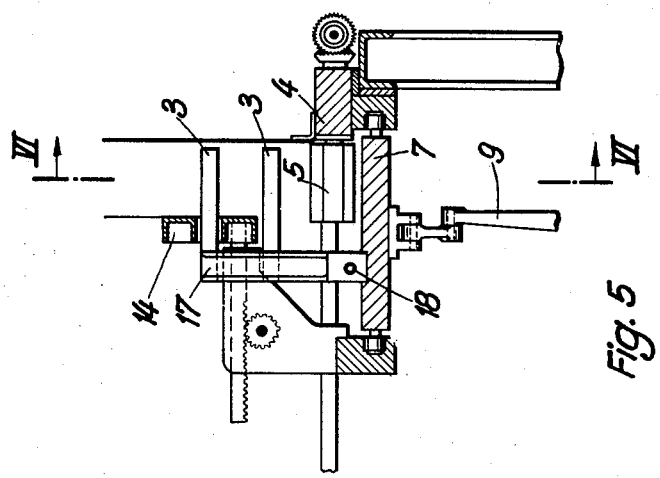

Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 5

Inventors
Eugene Georges Geoffroy
Aimé Pierre Laudrin
By

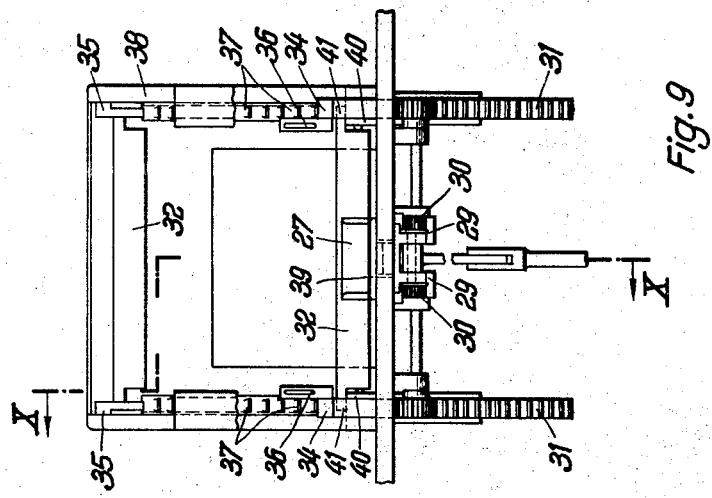
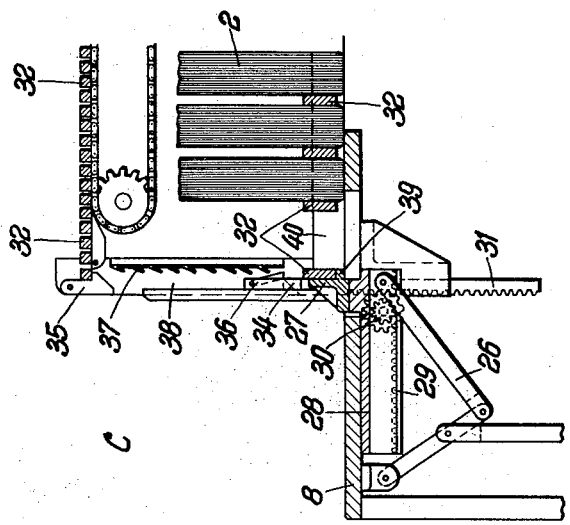

Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 7

Inventor:
Eugene George Geoffroy
Aimé Pierre Landrin
by

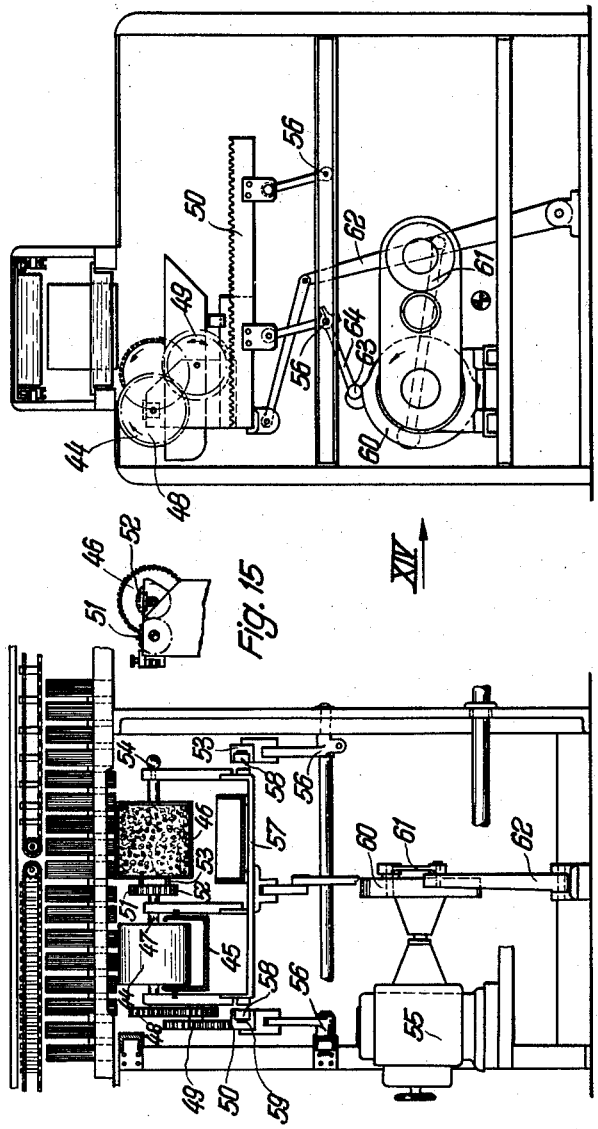

Aug. 25, 1964    E. G. GEOFFROY ETAL    3,146,127
MACHINE FOR GLUEING AND DRYING THE BACKS OF STITCHED BOOKS
Filed March 12, 1962    12 Sheets-Sheet 9

Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 10
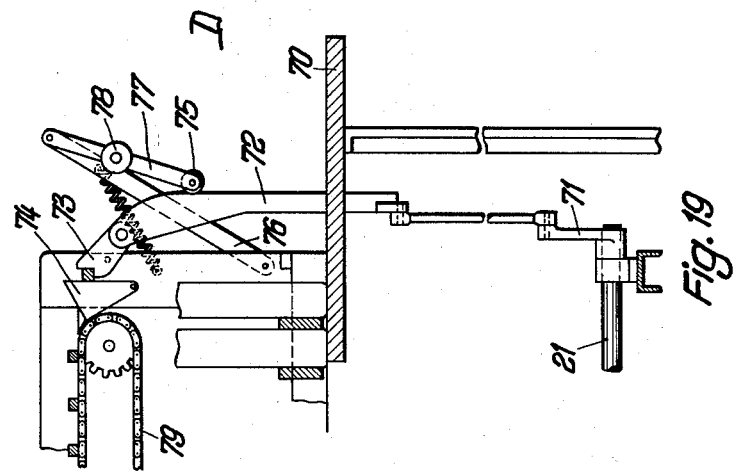
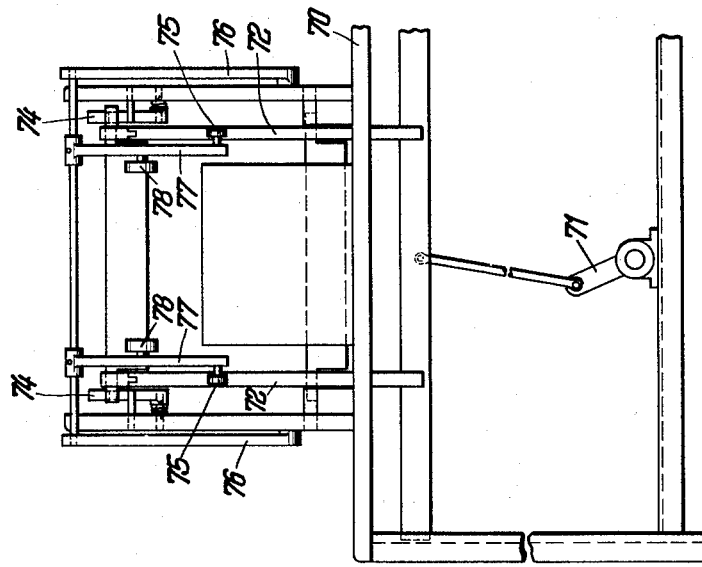
Inventors
Eugene Georges Geoffroy
Aimé Pierre Landrieu
by Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 11
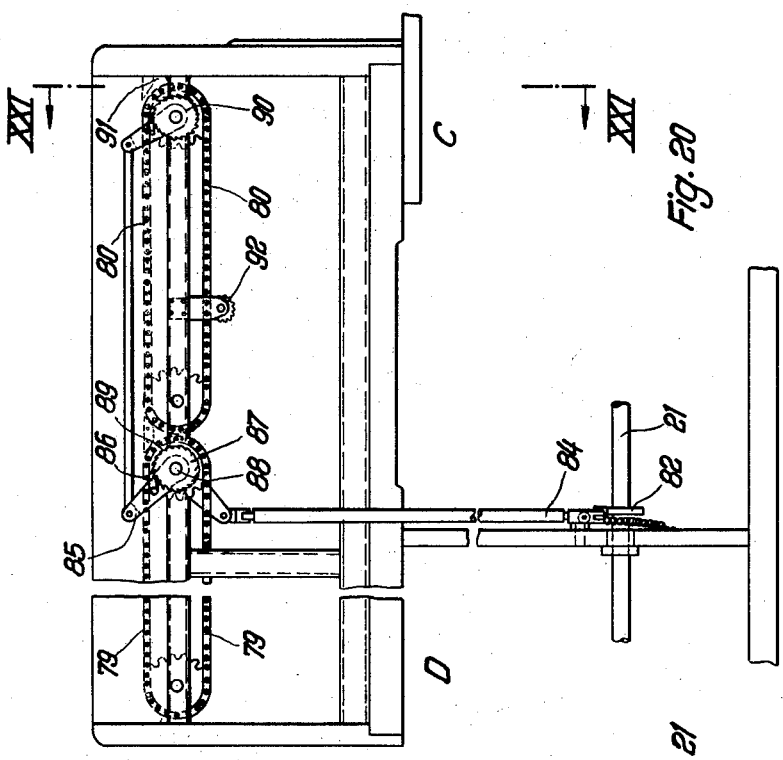
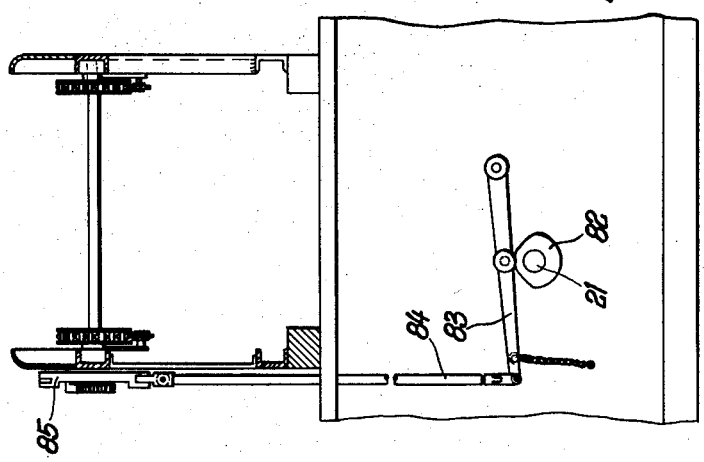
Inventors
Eugene Georges Geoffroy
Aimé Pierre Laudrin Aug. 25, 1964  E. G. GEOFFROY ETAL  3,146,127
MACHINE FOR GLUEING AND DRYING THE BACKS OF STITCHED BOOKS
Filed March 12, 1962  12 Sheets-Sheet 12
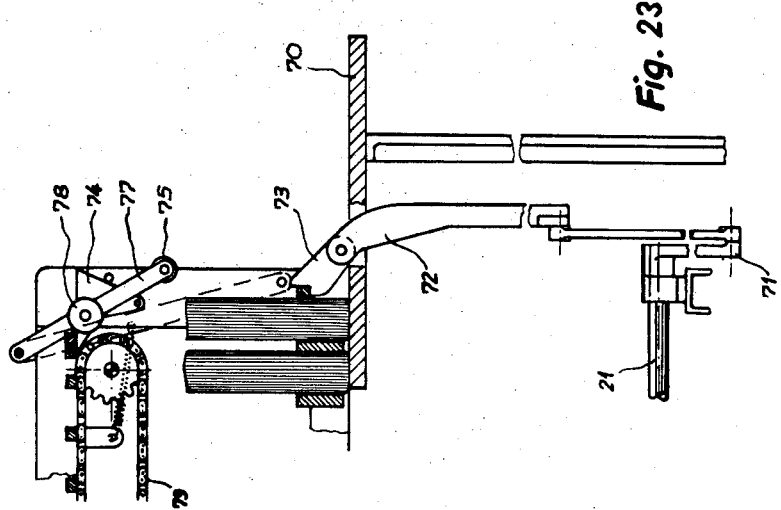
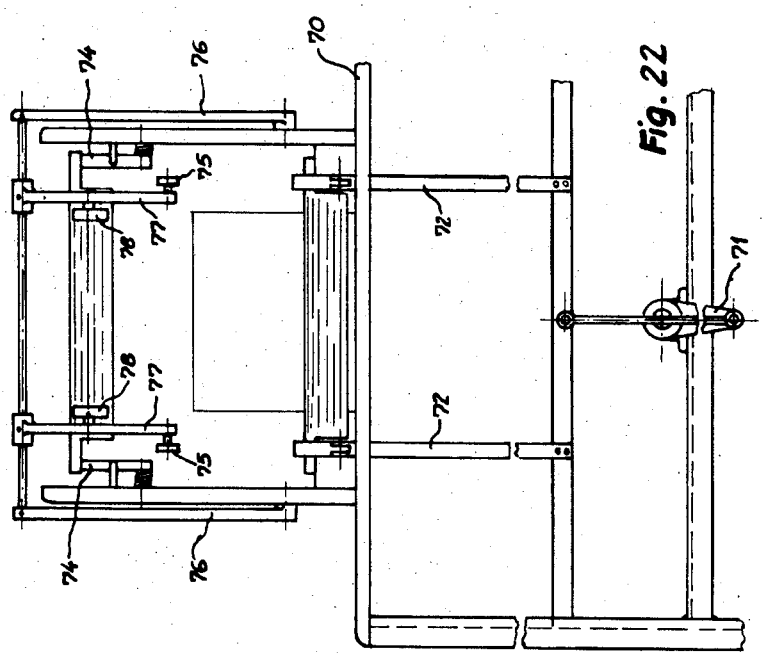
Inventors
EUGENE GEORGES GEOFFROY and
AIME PIERRE LAUNKIN
By
Attorney United States Patent Office 3,146,127
Patented Aug. 25, 1964

3,146,127
MACHINE FOR GLUEING AND DRYING THE
BACKS OF STITCHED BOOKS
Eugène Georges Geoffroy, Chatillon-sous-Bagneux, and
Aimé Pierre Laudrin, Briand, Bagneux, France, assignors to Rahdener Maschinenfabrik August Kolbus,
Rahden, Westphalia, Germany
Filed Mar. 12, 1962, Ser. No. 179,057
6 Claims. (Cl. 118—58)

This application is a continuation-in-part of our copending application Serial No. 783,315, filed on December 29, 1958, now abandoned.

Our invention relates to a machine for glueing and drying the backs of stitched books. The object of our invention is to provide a machine which not only operates fully automatically, but which operates continuously and efficiently on a large number of such books without occupying too much space within the work room.

In a known machine the books pass therethrough on a horizontal closed track with their narrow sides facing each other and in spaced relation. The books are held between two clamping plates, of which one is stationary and the other movable. Both plates are carried by guide rails and are pressed against each other by springs. Control means move the movable plate to and from the stationary plate.

In another machine endless conveyer chains are employed as transportation means for the books. The books are kept between a pair of cooperating clamping jaws, which are opened and closed in collaboration with springs by means of swiveling levers which are actuated by guiding means fixedly mounted on the machine frame. The books pass through the machine at a considerable distance from each other.

The disadvantages of the known machines are avoided by our new machine which in accordance with our invention comprises in combination a plurality of individual clamping plates adapted to be placed between the backs of stacked books facing each other with their wide sides; said clamping plates are supported by and guided in rails which are provided with resilient locking means for retaining said clamping plates in operating position and transporting means or pushers slidingly moving the stacked books with interposed clamping plates upon said guiding rails in a direction perpendicular to the side faces of the books with their backs exposed to the glue applying and drying means. Thus in our new machine the books are transversely passed through the machine close to each other and the individual books are separated and held by intermediate clamping plates with which they form a continuous stack. This stack is then passed alongside of, and with the backs of the books facing, a glueing and drying device. Thereafter the books and clamping plates are separated and the clamping plates returned to the initial position for repeated use.

The said and other objects of our invention will be more fully understood from the following specification when read with the accompanying drawing in which one embodiment is illustrated. In the drawing FIG. 1 is a longitudinal section through the entire machine, FIG. 2 is a top view thereof, FIG. 3 is a side view of the machine showing the feed belt for the books and the advancing device for inserting the books into the machine, FIG. 4 is a top view taken along lines IV—IV in FIG. 3, FIG. 5 is a sectional view along lines V—V in FIG. 3, FIG. 6 is a sectional view along lines VI—VI in FIG. 5, FIG. 7 is a front view of the driving means for the pusher referred to in the specification, FIG. 8 is a side view, partially in section, of said driving means for the pusher, FIG. 9 is a more detailed front view of the said pusher and its driving means, FIG. 10 is a sectional view taken along line X—X of FIG. 9, FIG. 11 is a perspective view of the clamping plates as they embrace the books and of their guide rails, and shows also the super-imposed piled up clamping plates returned from the output side of the machine, FIG. 12 shows a section through the guide rails for the clamping plates;

FIG. 13 is a side view of the glueing device and of its operating means;

FIG. 14 is a view thereof taken in direction of arrow XIV in FIG. 13;

FIG. 15 shows in detail the mounting of the brush for the glue;

FIG. 18 is a front view of the transfer mechanism for lifting the clamping plates at the output end of the machine to the return conveyer means;

FIG. 19 is a side view thereof, partially in section;

FIG. 20 is a front view of the return conveyer means;

FIG. 21 is a sectional view thereof taken along line XXI—XXI of FIG. 20; and

Figure 1:
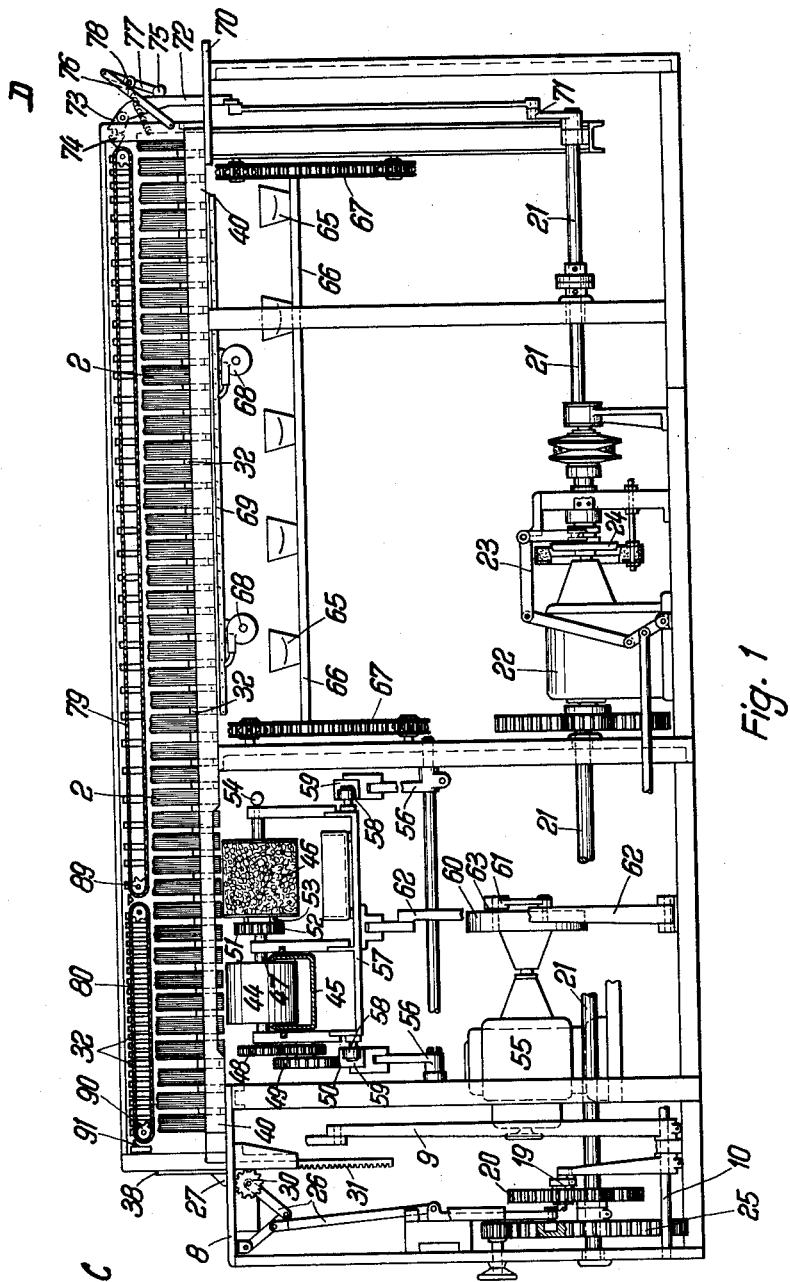

FIGS. 22 and 23 correspond to FIGS. 18 and 19 and show said transfer mechanism in its other extreme position.

The same reference numerals indicate the same elements in all figures of the drawing. The reference letters therein indicate the instrument panel A, the operator's stand B, the input side C and the output side D.

Figure 2:
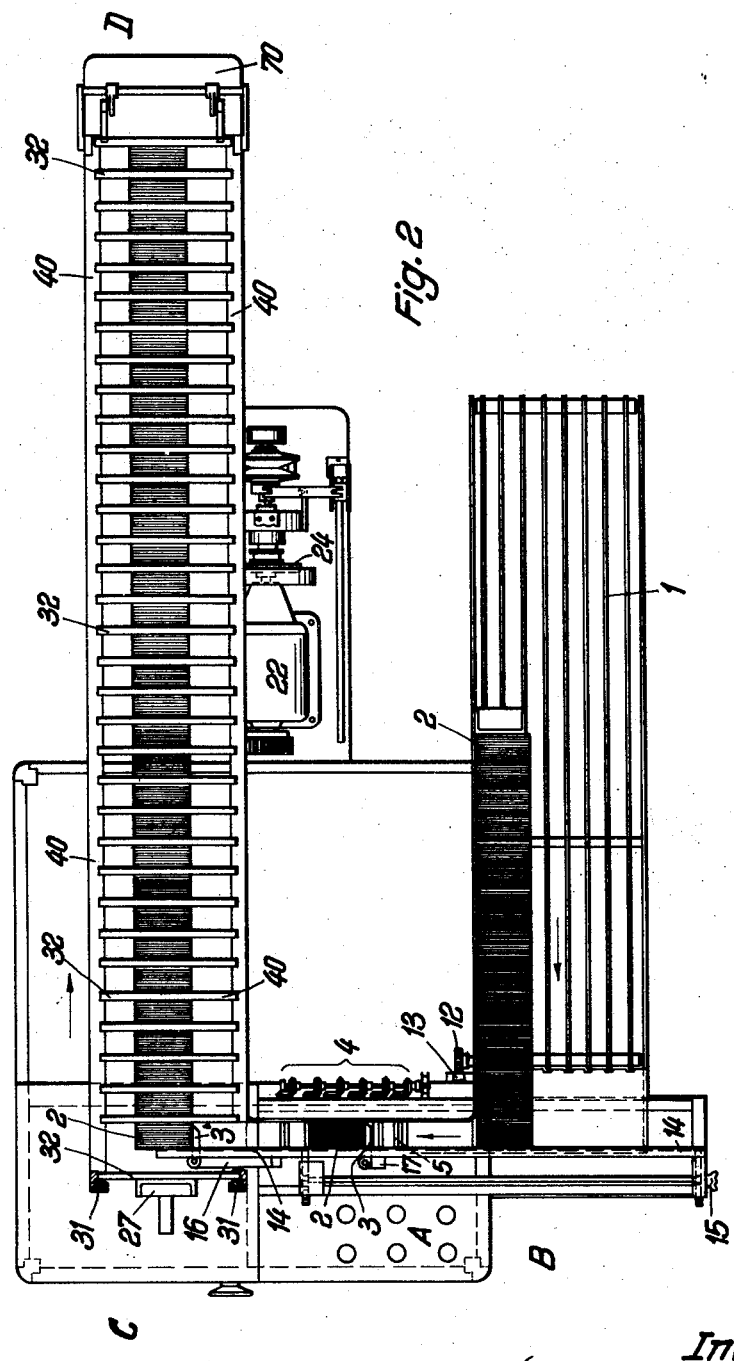
Figure 3:
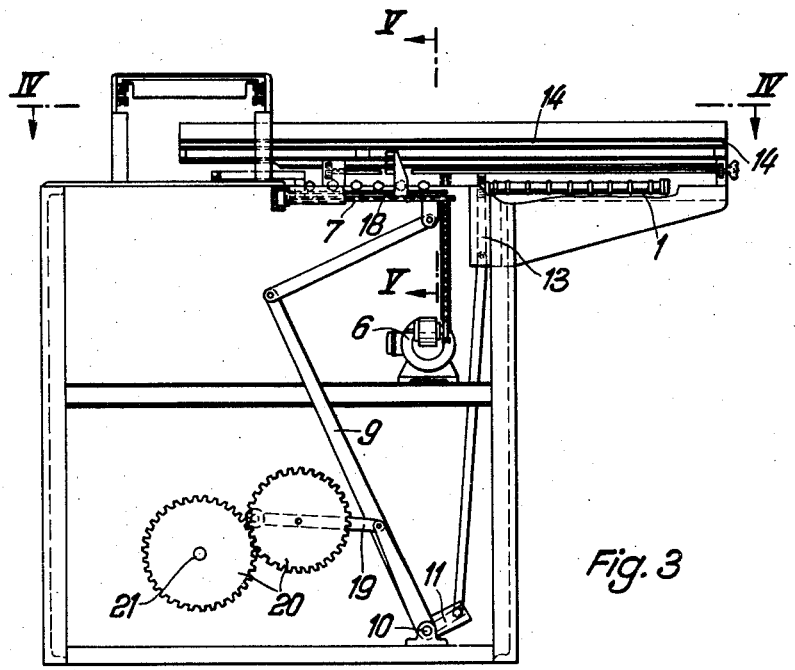
Figure 4:
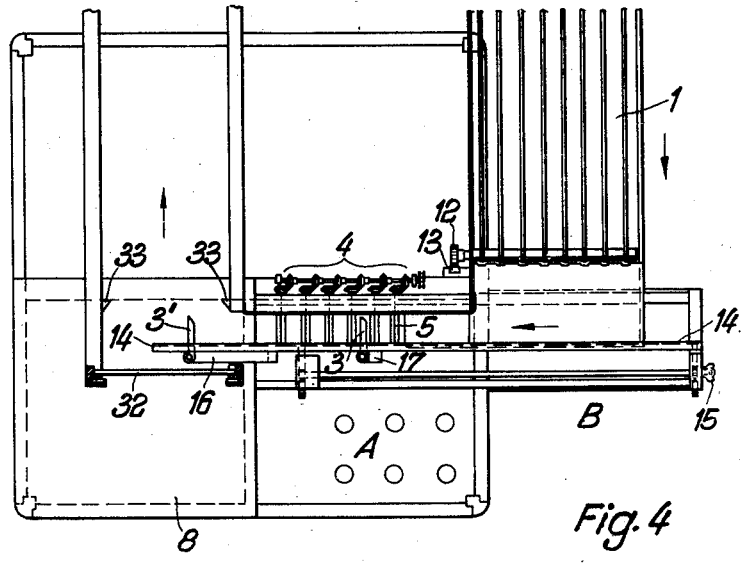
Figure 7:
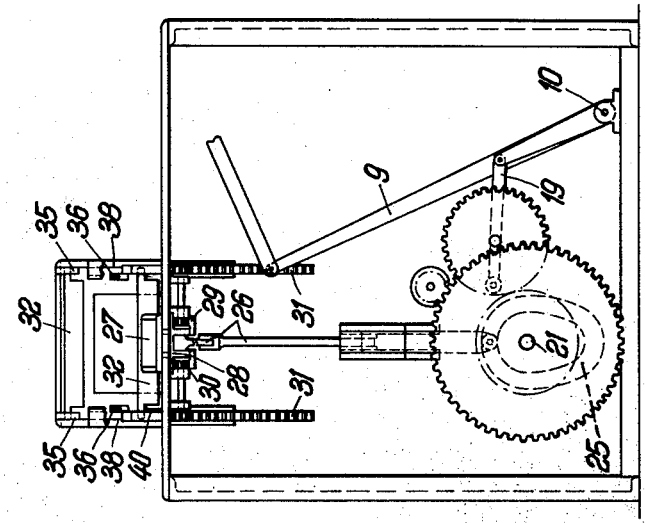
Figure 8:
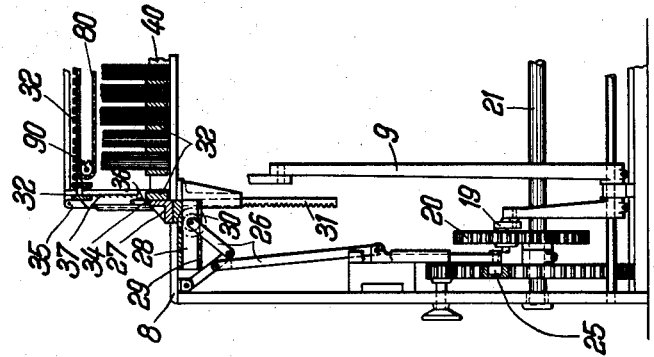

First referring to FIGS. 1 to 6 the machine may be described as follows:

The books 2 are placed with their backs on a belt conveyer 1 and are moved in the direction of the arrow shown in FIG. 2 to the left where each book is seized by a finger or other driver 3 which carries the book in the direction of the other shown arrow over a vibrating device 4 comprising a plurality of vibrating or shaking rollers 5. These rollers are driven by a motor 6 to turn in a direction opposite to the movement of the books. The vibrating device 4 makes the backs of the books even thereby preparing them for the following treatment. While the feed table 7 for the books returns, a detent member prevents the return of the books which are assembled one behind the other. The forward finger 3' of the feed table 7 seizes the leading book 2 and transfers the same to the table 8.

The conveyer belt 1 operates in the same rhythm as the lever 9 which actuates the feed table 7. A slotted arm 11, which may be adjusted in accordance with the required feeding steps, is keyed on the shaft 10. A toothed wheel 12 of the drive for the conveyer belt 1 is provided with an overrunning clutch and is driven by a toothed rod 13 actuated by said adjustable slotted arm 11. The books are transported by the belt 1 and are stopped by a rail 14 which may be adjusted by a hand wheel 15 in accordance with the thickness of the books relative to a stationary parallel rail to guide the books from the belt 1 to the operating part of the machine. The frontal feeder 16 comprises the finger 3' and the rear feeder 17 the fingers 3. When the feed table 7 returns, the said fingers 3, 3' yield elastically to the front. The said fingers 3, 3' are mounted on supports 17, 16, respectively, which supports are shiftable in forward and rearward direction on the feed table 7 by means of a threaded spindle 18 and thus may be adapted to the size of the books. The fingers 3, 3' are tiltably mounted on said supports so that they may yield when the feed table 7 returns.

A lever 9 keyed to shaft 10 moves the feeder table 7 and is actuated by the crank device 19 which is driven by the gearing 20 rotated by the drive shaft 21.

The machine is driven by a continuously adjustable gearing 22 as more particularly shown in FIG. 1. An electromagnetic device of known construction (not shown) cooperates with electrical contacts arranged at critical places in the machine and stops the same immediately in case of any disturbance by means of the leverage 23 which disengages the machine and operates the brake 24.

As shown in FIGS. 7 through 10 the above mentioned drive shaft 21 has keyed thereupon a cam eccentric 25 which by means of a cam follower actuates a toggle joint 26 operating a sliding carriage 28. This carriage 28 supports a pusher 27 and is provided with a pair of toothed rods 29 each driving a pinion 30 which engages a toothed rod 31 to impart to the same an upward and downward displacement.

After the finger 3' has moved a book upon the table 8 and while the feeding table 7 with the fingers 3 returns to its starting position, the pusher 27 starts to operate. The pusher 27 pushes a clamping plate 32 against the introduced book and pushes both, as well as possibly preceding books and jaws, to the right as indicated by the arrow in FIG. 2 until the clamping plate 32 is retained by resilient locking means 33. While the pusher 27 moves forward the two toothed rods 31 are moved upward. The upper end of each rod 31 is chamfered and operates on a spring mounted pawl 35 (FIGS. 7 to 10). Another pawl 36 mounted on each of said rods 31 comes in the elevated position of said rods to rest upon the clamping plate 32 previously held by the pawl 35 (FIGS. 9, 10) and carries said clamping plate 32 downward when the rods 31 return. Guide means 38 for said rods are provided with scaled retaining springs 37 which prevent the downwardly carried clamping plate 32 from dropping freely. After the pusher 27 has returned to its initial position, the said clamping plate places itself on a supporting projection 39 of the pusher 27. Thereafter another book is moved by the finger 3' in front of said clamping plate.

Figure 11:
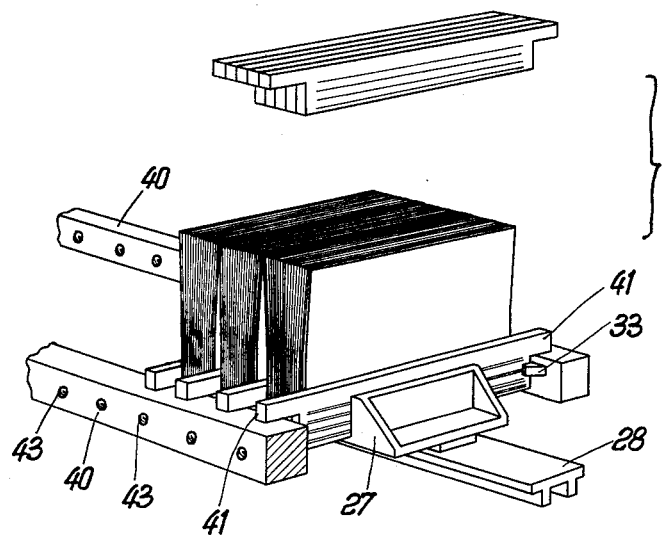
Figure 12:
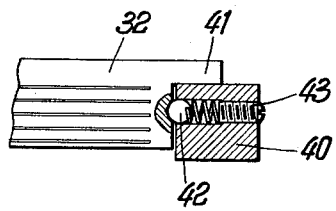

Two rails 40 extending alongside the machine serve to slidingly support the clamping plates 32 with the books clamped in between. At each forward movement of the pusher 27 another book and clamping plate are added to the stack already resting on the rails 40. As shown in FIG. 11 each clamping plate is provided with projections 41 which glide on the rails 40. These rails are provided with resilient braking means for the clamping plates, for example a plurality of regularly spaced elastically mounted steel balls 42 which press against the clamping plates and retard the same (FIGS. 11 and 12). Thus the required pressure between the plates 32 and the books 2 is maintained. The lower edges of the clamping plates are located slightly, for example about five millimeters, above the plane of the backs of the books. The pressure of said steel balls 42 against the clamping plates 32 may be regulated by adjusting screws 43.

The books clamped between the plates are guided by the rails 40 to the glueing and drying device as illustrated in FIGS. 13 to 15 and FIGS. 16 and 17, respectively.

The glueing device (FIGS. 13 to 15) comprises a rotating cylinder 44 which supplies glue to the backs of the books from a container 45 and a rotating cylindrical brush 46 which evenly distributes the glue upon said backs.

The cylinder 44 turns with a shaft 47 driven by the gear wheel 48. This gear wheel drives a gearing 49 which includes an overrunning clutch and engages a toothed rod 50 which is tiltably mounted upon the machine frame. On the other side of the cylinder another pinion 51 is keyed upon the shaft 47 and engages a pinion 52 mounted in a swiveling bearing (FIG. 15). This pinion 52 engages the brush 46 by means of two driving pins 53. The swiveling bearing will permit to swing the brush 46 as required more or less close to the backs of the books. The brush 46 and the cylinder 44 turn in opposite directions in order to better distribute the glue. The cylinder 44 and the brush 46 are provided with a not shown glue scraper of any known construction.

The brush 46 can be interchanged by pulling laterally the spherical knob 54 which is elastically mounted. The glueing device is driven independently from the main machine drive by an infinitely variable motor 55, and is supported by a plate or the like 57 resting upon rollers 58 which move in tracks 59 mounted on swiveling levers 56. The said motor 55 turns a cam disk 60 which actuates a crank rod 61 and a lever 62 to effect a reciprocating movement of the glueing device along the backs of the books. The cam disk 60 cooperates with the roller 63 which is eccentrically mounted on the lever 64 forming a double armed lever with one of the above mentioned levers 56 to raise or lower the glueing device relative to the backs of the books. The cylinder 44 and the brush 46 are rotated when the pinion 49 engages the toothed rod 50 and the latter is displaced by the lever 62. When the rod 50 is moved from right to left the roller 63 runs on the depressed portion of the cam disk 60 and the lever 63 causes the plate 57 supporting the glueing device to move away from the backs of the books. The pinion 43 engaging the rod 50 turns now in opposite direction and the overrunning clutch in the gear 49 causes the other gear together with the cylinder 44 and brush 46 to stay at rest. The separate driving motor 55 for the glueing device is necessary because the latter's reciprocating movements depend on the thickness of the books; the glueing device has to operate quicker on thick books and slower on thinner books.

Figure 16:
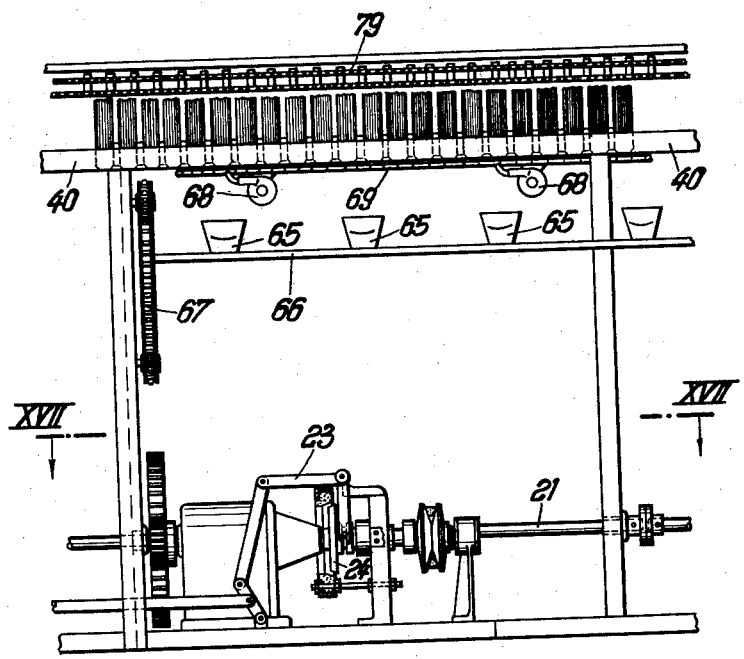
FIG. 16 is a front view of the drying device and of its operating means.
Figure 17:
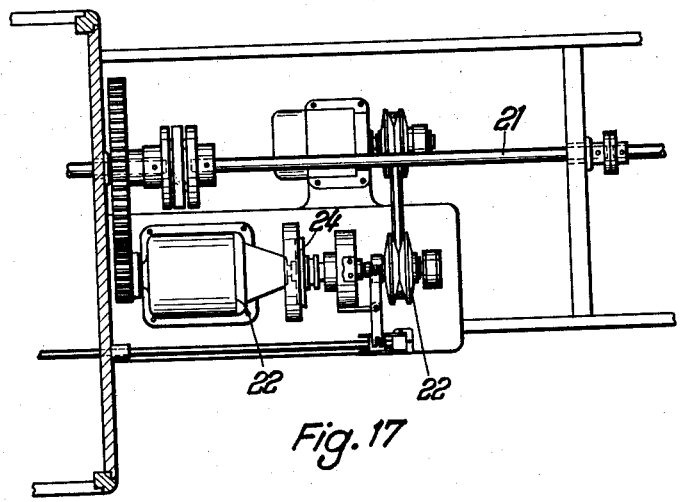
FIG. 17 is a horizontal view taken along line XVII—XVII of FIG. 16.

The drying device, illustrated in detail in FIGS. 16 and 17, operates following the glueing device and comprises a series of heating elements such as infrared heaters 65 which are supported by a frame 66 arranged below the passing book backs. The position of the frame 66 is adjustable, for example, by a hand operated chain drive 67. One or more blow pipes 69 arranged below the book backs and adjustable in their longitudinal direction receive air from one or more blowers 68 and direct the air against the forward moving book backs to improve and accelerate the drying.

When the stacked books and clamping plates 41 complete their movement on the rails 40, they are transferred to a receiving table 70 as shown in FIGS. 18 and 19. From there the clamping plates 32 are lifted as shown in FIGS. 22 and 23 to a return track such as the endless chain 79, which in cooperation with the adjoining chain 80 (see FIG. 20) returns the clamping plates to the feeding end C of the rails 40 (FIGS. 9 and 10). The lifting means for the clamping plates comprise a crank arm 71 keyed upon the above mentioned shaft 21, said crank arm reciprocating slidably guided arms 72. A finger 73 jointed to each arm 72 seizes the projecting ends of the clamping plates and brings them to rest against a saddle member 74 which is swingably mounted on the machine frame and by not shown springs held in the shown position. The arms 72 have a curved surface upon which rollers 75 glide. These rollers 75 are part of a swing frame 76 mounted on the machine frame. When the arm 72 moves upward, into the position shown in FIGS. 18 and 19, it swings by means of the roller 75 the swing frame 76 away from the saddle member 74. When the arm 72 moves downward, the swing frame 76 with arms 77 returns under the force of the shown spring into the position shown in FIGS. 22, 23 and rollers, preferably rubber rollers 78 mounted on the arms 77 push the clamping plate held by the fingers 73 upon the conveyer chain 79.

The device for returning the clamping plates 32 from the output side D to the input side C is composed of the receiving conveyer chain 79, which receives the plates lifted from the guiding rails 40, and of the delivering conveyer chain 80 which delivers said clamping plates to the input side C for repeated use upon the rails 40 between the books. The said conveyer chains 79 and 80 are in known manner carried by wheels which are driven by a cam 82 keyed upon the before referred to shaft 21. This cam 82 swings a rocking lever 83 which operates through the rod 84 a bellcrank lever 85 and through the pawl 86 a ratchet wheel 87 mounted on shaft 88 of the chain wheel 89 supporting the conveyer chain 79. A connecting rod linked to the outer arm of the bellcrank lever 85 operates a pawl and ratchet mechanism 90 driving, the chain wheel for the other conveyer chain 80 at the input side C. This pawl and ratchet device for the chain 80 is in known manner adjustable so that the stepwise advance of this chain 80 may be regulated to insure a safe and proper transfer of the clamping plates 32 to the rails 40 at the input end of the machine, while the quicker advance of the chain 79 located at the output side D of the machine causes a quicker return of said clamping plates to the chain 80.

The clamping plates 32 are placed on the conveyor chains 79, 80 only loosely so that they pile up closely on the chain 80. The conveying tracks of the chains are preferably supported by rails or the like to keep them in straight horizontal position, while the return tracks are supported by tension rollers 92.

While one embodiment of our invention has been shown and described in detail to illustrate the application of the principles of our invention, it will be well understood that the same may be otherwise embodied without departing from such principles.

What we claim as our invention is:

1. In a machine for glueing and drying the back edges of books including means for applying glue to the backs of the books and for drying the glue thus applied the improvement comprising
   (a) a plurality of clamping plates adapted to be placed between the backs of stacked books facing each other with their wide sides;
   (b) guiding rails supporting said clamping plates at their ends;
   (c) resilient locking means on said rails for retaining said clamping plates;
   (d) and transporting means slidingly moving the stacked books with interposed clamping plates upon said guiding rails in a direction perpendicular to the side faces of the books with their backs exposed to said glue applying and drying means.

2. In a machine according to claim 1 the improvement comprising
   (a) a feeder table located next to and parallel to said rails and adapted to support stacked books resting on their back;
   (b) means moving the stacked books on said feeder table in a direction opposite to the direction of movement of the books upon said rails;
   (c) receiving means holding each book as it reaches the end of the feeder table and separating such book from the stack;
   (d) and transfer means transferring such book to said guiding rails and against the clamping plate holding the preceding book.

3. In a machine according to claim 1 the improvement comprising
   (a) means at the end of the rails removing the clamping plates from each book as it reaches said end of the rails; and
   (b) conveying means arranged above said rails for a return movement of the removed clamping plates to the feeding end of the rails to clamp the book last transferred thereupon from the feeder table.

4. In a machine according to claim 1 the improvement comprising a plurality of regularly spaced braking members elastically mounted in the guiding rails and adapted to temporarily engage the clamping plates as they advance on said rails.

5. In a machine according to claim 3, said conveying means comprising a receiving and a delivering conveyer chain operating in series, driving means advancing said chains in coordinated step by step movement, and adjusting means to separately control the speed of at least the receiving conveyer chain to impart to the same a quicker motion.

6. In a machine according to claim 3 the improvement comprising transfer means at the feeding end of the guiding rails for removing one clamping plate from said conveying means and placing such plate upon the guiding rails in front of the book last placed thereupon.

References Cited in the file of this patent
UNITED STATES PATENTS

| | | |
|---|---|---|
| 1,152,907 | Risberg | Sept. 7, 1915 |
| 1,931,244 | Alger et al. | Oct. 17, 1933 |
| 2,755,491 | Terzuoli et al. | July 24, 1956 |